United States Patent

[11] 3,592,070

| [72] | Inventor | Ivan K. Hammond<br>Box 182, Boonton, N.J. 07005 |
|------|----------|------------------------------------------------|
| [21] | Appl. No. | 841,534 |
| [22] | Filed | July 14, 1969 |
| [45] | Patented | July 13, 1971 |

[54] LINEAR ACTUATOR
3 Claims, 2 Drawing Figs.

| [52] | U.S. Cl. | 74/89.15, 74/424.8 R |
|------|----------|----------------------|
| [51] | Int. Cl. | F16h 27/02, F16h 1/18 |
| [50] | Field of Search | 74/89.15, 424.8; 100/289, 290 |

[56] References Cited
UNITED STATES PATENTS

| 1,862,759 | 6/1932 | Morrison | 74/424.8 |
| 3,277,736 | 10/1966 | Goodman | 74/424.8 |
| 3,421,383 | 1/1969 | Smith et al. | 74/424.8 |

Primary Examiner—William F. O'Dea
Assistant Examiner—Wesley S. Ratliff, Jr.
Attorney—Marvin A. Naigur

ABSTRACT: A linear actuator for telescopic movement is provided in which rotation of an inner shaft transmits linear movement to at least one outer hollow arm. The inner shaft is placed in threadable engagement with the outer arm which is provided with an external key that slides in a keyway formed in a support housing.

PATENTED JUL 13 1971

3,592,070

INVENTOR.
IVAN K. HAMMOND
BY Marvin A. Naigur
ATTORNEY 3,592,070

LINEAR ACTUATOR

BACKGROUND OF THE INVENTION

Many industrial procedures require the ability to remotely extend and retract objects with a high degree of accuracy and smooth operation. For example, in the heat treatment of metals it is necessary to slowly extend the metals in the heat treatment zone of the oven. This has usually been accomplished by cumbersome devices which require a large amount of space and which could not be modified for a larger degree of extension and retraction. The present invention provides a means for obtaining maximum linear extension for a given cross-sectional space such that all of the extendible units which can occupy a given cross-sectional area are utilized. Further, the instant invention allows for increasing and decreasing the maximum extendible length of an existing linear actuator by easily adding and removing elements from the unit.

SUMMARY OF THE INVENTION

In accordance with an illustrative embodiment demonstrating features and advantages of the present invention there is provided a linear actuator for telescopic extension and retraction movement comprising at least one rotary inner shaft partially formed with external threads. There is also provided at least one hollow outer arm partially formed with internal threads for threadable engagement with the inner shaft. A supporting means is provided and a key means is fixed to the exterior surface of the supporting means. The outer arm is formed with an internal keyway which is capable of sliding movement in the keyway, whereby rotation of the inner shaft will actuate the outer arm to be telescopically extended and retracted with respect to the inner shaft and the supporting means.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings wherein.

DESCRIPTION OF THE PREFERRED EMBODIMENT

Figure 1:
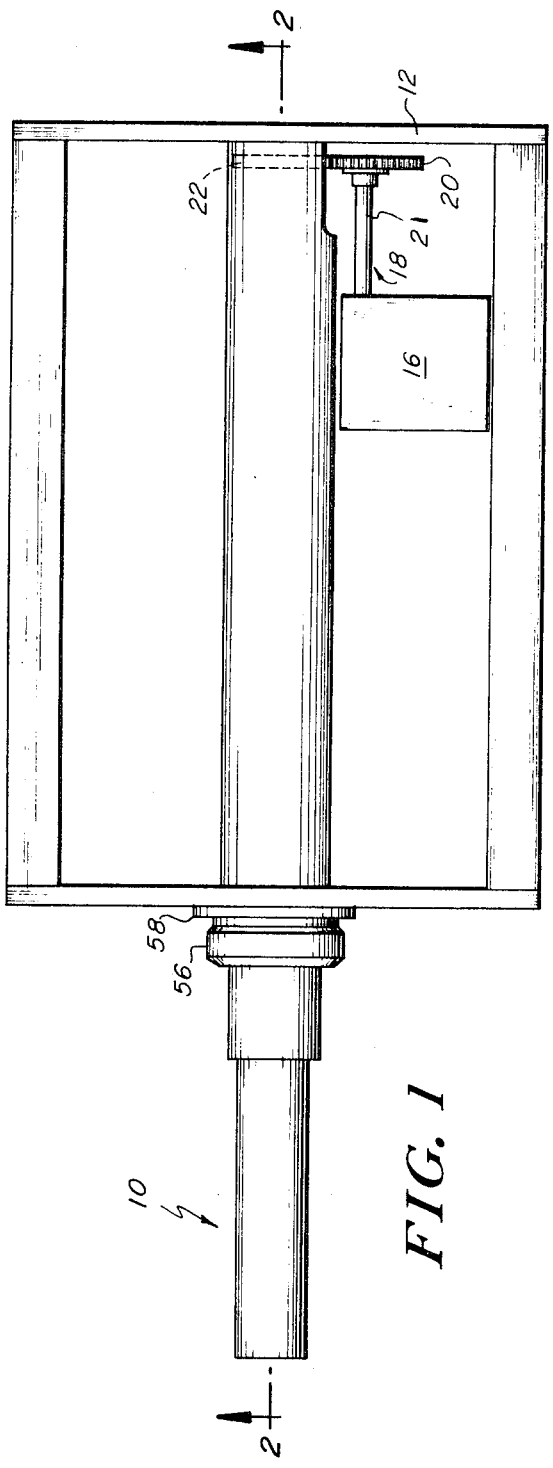
FIG. 1 is an elevational view of a motor-driven gear unit in which the linear actuator of the present invention is employed.

With reference to FIG. 1, there is shown a linear actuator generally designated by the reference numeral 10, and mounted in a motor housing 12. A motor 16 is also positioned within the housing 12 together with a gear train 18 which includes a drive gear 20 and a driven gear 22. The drive gear 20 is driven by a shaft 21 of the motor 16 and the driven gear 22 is fixed to the linear actuator 10.

Figure 2:
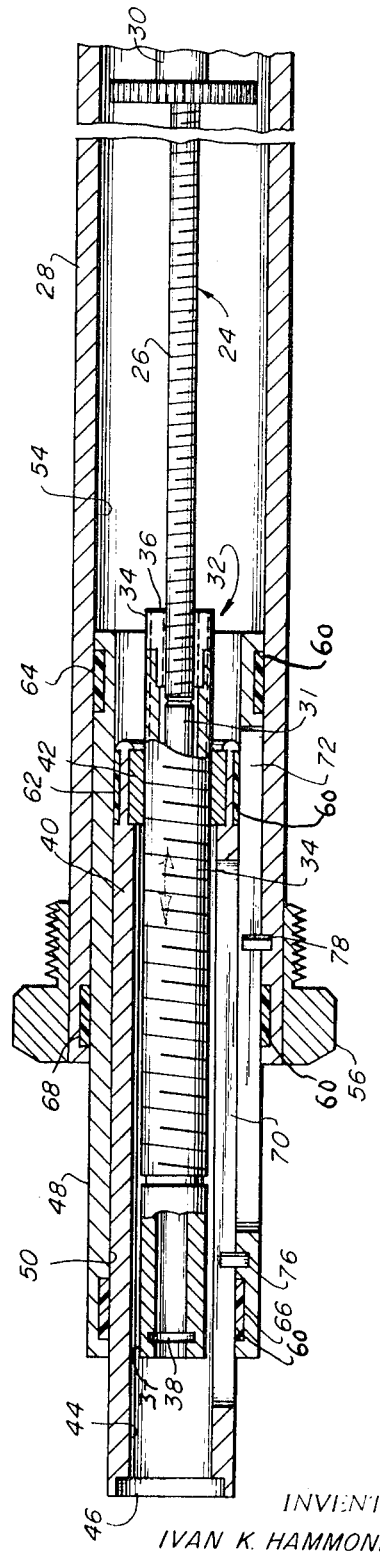
FIG. 2 is a longitudinal sectional view of the linear actuator of FIG. 1, taken along the line 2–2.

As shown in FIG. 2, the linear actuator 10 includes a rotary inner shaft 24 which is formed with external threads 26, and driven gear 22 is mounted on the inner shaft 24. The inner shaft 24 is mounted in a cylindrical support housing 28, one end of which is formed with a bearing 30 for rotatably receiving the shaft 24. The end of shaft 24 is formed with an unthreaded diameter 31 for preventing further extension of the linear actuator 10, as will hereafter be more fully described.

A hollow outer shaft 32 is formed with external threads 34 and an internally threaded collar 36 is mounted on the end of shaft 32 for threadable engagement with the external threads 26 of inner shaft 24. The end of outer shaft 32 is formed with an unthreaded diameter 37 which acts as a stop for preventing further extension of the linear actuator 10. A clip ring 38 is mounted at the end of outer shaft 32 such that inward movement of shaft 32 toward bearing 30 is limited when clip ring 38 contacts the end of unthreaded diameter 31. For the sake of simplicity, only one outer shaft 32 has been shown in the drawings. However, it should be noted that a plurality of hollow outer shafts similar to shaft 32 may be provided with each shaft having an outer diameter which is sized for being coaxially received within the internally threaded portion of the next successive larger shaft.

Mounted on outer shaft 32 is a hollow cylindrical inner arm 40 on which there is fixed a threaded collar 42, for threadably engaging external threads 34. The cylindrical inner arm 40 is sized with an internal diameter 44 for coaxially receiving outer shaft 32, and an end clip ring 46 is secured to the outermost portion of cylindrical inner arm 40. A hollow cylindrical outer arm 48 which is sized with an internal diameter 50 for being coaxially mounted on inner arm 40, represents the outermost extendible element of the linear actuator 10. The outer arm 48 is mounted within the support housing 28 which is sized with an internal diameter 54 for coaxially receiving outer arm 48. An externally threaded mounting collar 56 is secured to the end of support housing 28 to serve as a means for mounting the linear actuator 10 to motor housing 12, on which there is mounted an internally threaded ring 58. As in the case of the outer shaft 32, only one outer arm 48 has been shown in the drawings, but additional outer arms could be provided to function in accordance with the present invention.

The linear actuator 10 is provided with internal annular rings 60 which serve as bearing surfaces. It is preferable to fabricate the annular rings 60 of a material such as Teflon® to allow for smooth, free extension and retraction movement of the linear actuator 10. In order to mount the annular rings 60 in the linear actuator 10, outer grooves 62 and 64 are respectively formed on the outer surfaces of inner arm 40 and outer arm 48, and inner grooves 66 and 68 are respectively formed along the internal diameters 50 and 54. Thus, during the extension and retraction movement of linear actuator 10, the annular rings 60 in outer grooves 62 and 64 will respectively bear against internal diameters 50 and 54, and the annular rings 60 in inner grooves 66 and 68 will respectively bear against the outer surfaces of inner arm 40 and outer arm 48, to thereby provide smooth and free linear movement.

As shown in FIG. 2, the inner arm 40 is formed with an inner internal keyway 70 which laterally extends along internal diameter 44 and the outer arm 48 is formed with an outer internal keyway 72 which laterally extends along internal diameter 50. An inner key 76 is mounted on outer arm 48, extending inwardly from internal diameter 50, and an outer key 78 is mounted on support housing 28, extending inwardly from internal diameter 54.

In the operation of the linear actuator 10, rotary motion is transmitted from the motor 16 through gear train 18 to the inner shaft 24. The rotation of inner shaft 24 is translated into linear motion through outer shaft 32, inner arm 40 and outer arm 48. In this manner, the inner key 76 will slide in inner keyway 70 and the outer key 78 will slide in outer keyway 72. Thus, the rotation of inner shaft 24 actuates the outer shaft 32, inner arm 40, and outer arm 48, to be linearly extended and retracted with respect to support housing 28. The unthreaded diameters 31 and 37 serve as a stop means for preventing further extension of outer shaft 32 and inner arm 40. Serving as a stop means for the retraction of linear actuator 10, are the clip rings 38 and 46 which respectively contact the end of inner shaft 24 and outer shaft 32 when the linear actuator 10 is in a fully retracted position.

A latitude of modification, change, and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A linear actuator for telescopic extension and retraction movement comprising a plurality of shafts including a rotary stationary shaft formed with external threads and at least one hollow rotary extendible shaft formed with internal threads and external threads and said stationary shaft being threadably engaged with said extendible shaft, and a plurality of hollow arms including an inner arm formed with an external first elongated keyway and a threaded member formed with internal threads mounted on said inner arm for threadable engagement with the outermost extendible shaft, at least one outer arm formed with an external second elongated keyway such that the hollow outer arm can be coaxially mounted with respect to said inner arm, and a support housing for coaxially receiving said outer arm, first key means on said outer arm capable of sliding movement in said first keyway, second key means on said support housing capable of sliding movement in said second keyway, whereby rotation of said stationary shaft will actuate said extendible shaft, said inner arm, and said outer arm to be linearly extended and retracted with respect to said support housing.

2. A linear actuator according to claim 1 in which a first bearing means is disposed between said inner arm and said outer arm and a second bearing means is disposed between said outer arm and said support housing.

3. A linear actuator according to claim 1 in which said stationary shaft, extendible shaft, hollow arms, and support housing are cylindrically shaped and formed with internal diameters which are sized for coaxially mounting the shafts and arms within said support housing, and internal clip rings are mounted in said inner arm and said outer arm to form a stop means such that said inner arm and outer arm is prevented from moving past a fully retracted position.